UNITED STATES PATENT OFFICE.

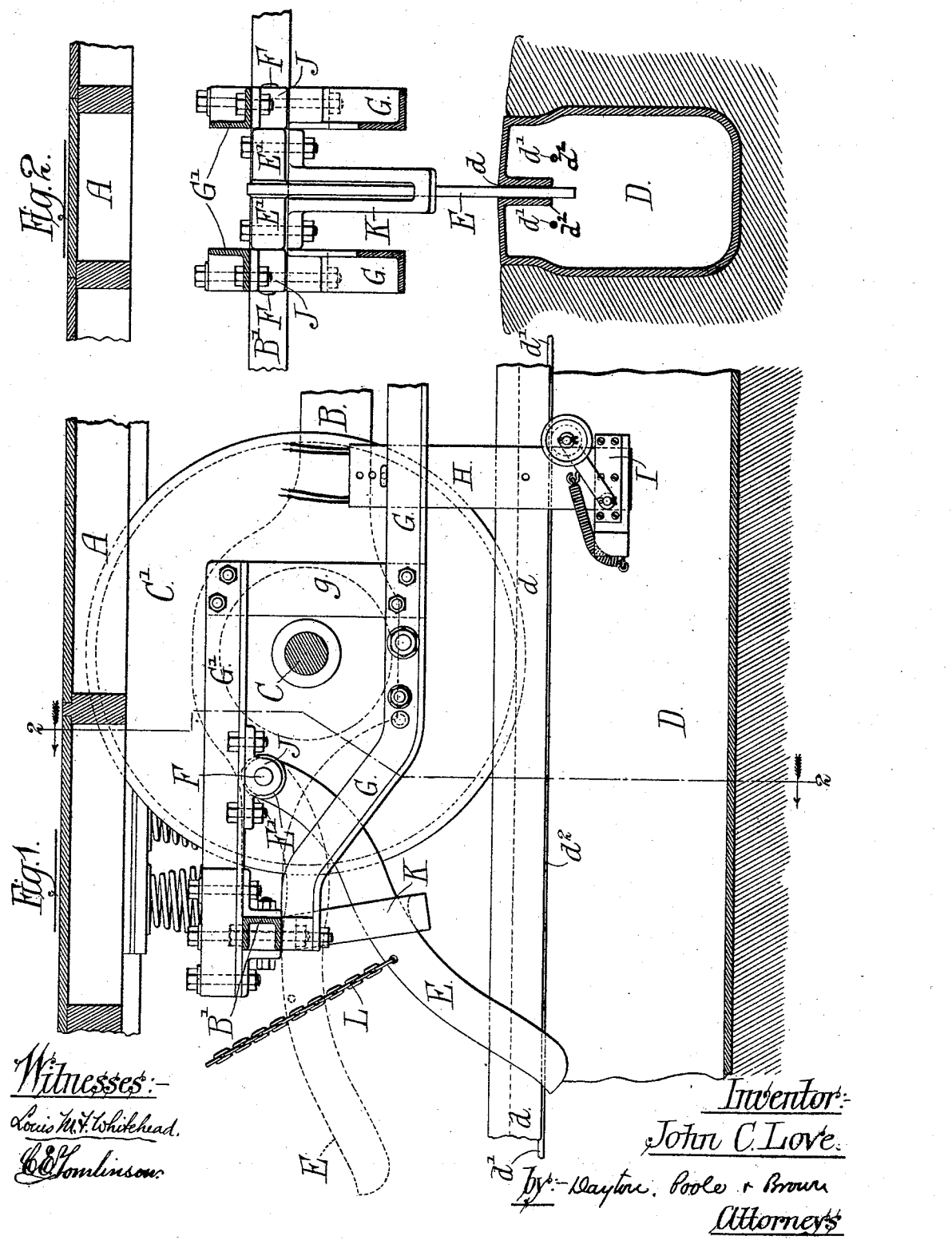

JOHN C. LOVE, OF CHICAGO, ILLINOIS, ASSIGNOR TO THE LOVE ELECTRIC TRACTION COMPANY, OF SAME PLACE.

CLEARER FOR SLOTTED CONDUITS.

SPECIFICATION forming part of Letters Patent No. 498,437, dated May 30, 1893.

Application filed May 17, 1892. Serial No. 433,368. (No model.)

*To all whom it may concern:*

Be it known that I, JOHN C. LOVE, of Chicago, in the county of Cook and State of Illinois, have invented certain new and useful Improvements in Clearers for Slotted Conduits; and I do hereby declare that the following is a full, clear, and exact description thereof, reference being had to the accompanying drawings, and to the letters of reference marked thereon, which form a part of this specification.

This invention relates to a novel device for keeping clear from obstructions the conduit slots of electric and other railways having slotted conduits, and it consists in the matters hereinafter described and pointed out in the appended claims.

In the accompanying drawings: Figure 1 illustrates my invention as applied to an electric railway car, the parts of the car to which the invention is applied being shown in central vertical section. Fig. 2 is a cross-section taken upon line 2—2 of Fig. 1.

As shown in said drawings, A is the frame or platform of the car, B the car truck, C one of the wheel axles, and C' one of the supporting wheels of the car.

D indicates the conduit which is located below the surface of the ground between the track rails and is provided with a slot $d$. In the particular construction illustrated said conduit is adapted for an electric road and contains conducting wires $d'$ $d'$, and is provided with depending parallel flanges $d^2$ $d^2$ at opposite sides of the slot to prevent access of mud or water from the street to the said conductors.

The device for removing obstructions or keeping clear the slot consists of the bar E which is attached to the truck and is adapted at its lower end to pass through the slot D into the interior of the conduit. For this purpose the lower end of the slot clearer is made of proper thickness to pass through the slot and of considerable width in order that it may have sufficient strength above its part which enters the slot.

The clearer may be made of any desired shape to give suitable strength therein but as herein shown the entire clearer consists of a flat metal bar slightly curved to better adapt it to the adjacent parts of the truck and connected at its upper end with the truck by a horizontal pivot F whereby its lower or free end may either be dropped so as to pass through the slot of the conduit or lifted free from the same.

In the particular construction of the truck herein illustrated the same is provided with two parallel angle bars G G which are attached to the cross-girt B' at one end of the truck and with other parallel angle bars G' G' located above those before described attached to the cross-girt B' and extending over the axle C, the angle bars G G' being connected by vertical straps $g$ $g$. The bars G G' $g$ arranged as described are employed to sustain the supporting bar H by which a traveling contact device I is supported within the conduit. In connection with this arrangement of the truck frame the pivot F of the slot clearer is shown as mounted in two bearing boxes J J attached to the angle bars G' G' at a point between the cross-girt B' and the axle C.

The said track clearer is herein shown as attached to a tubular part or sleeve E' through which passes the pivot F. The sleeve E' serves to maintain the track clearer in its central position and also to give additional stiffness to the pivot F.

The clearer E stands in a downwardly and forwardly inclined position and may be held or supported at the downward or backward limit of its movement by any suitably located stop or support upon the truck frame. In the particular construction shown a supporting bar or stirrup K is bolted at its upper end to the cross-girt B' and is adapted to embrace the track clearer so as both to limit its downward movement and to form a guide therefor when it is swung on its pivot.

Any suitable means may be employed for lifting the clearer and holding it in its elevated position, that herein shown consisting of a chain L attached to the lower part of the clearer and extending upwardly to the car where it may be secured by any suitable means.

An important advantage in the use of the clearer arranged as described is that it insures the removal from the conduit slot of pebbles, fragments of stone, or other objects which may fall and become wedged therein by the action or pressure of vehicle wheels, and also to remove obstructions intentionally placed in the slot by mischievous persons. The slot clearer thus arranged serves to prevent injury to the supporting bar of the contact device of an electric car which is liable to occur in case such supporting bar were to come in contact with obstructions firmly wedged in the slot, and my improvement has similar advantages when applied to a car of a cable railway in preventing accident to the supporting bar of the gripping mechanism.

The slot clearer described has special advantages in connection with a conduit for an electric railway having depending flanges at either side of its slot, as shown in the drawings, for the reason that obstructions are more likely to become caught or wedged between said flanges than between the vertically narrow walls of a slot such as is commonly used in a cable railway, and to insure the upward removal of obstructions from a slot of the kind shown in the drawings the lower part of the clearer is preferably extended downwardly so as to reach below the lower edges of said flanges and is inclined so that it will tend to lift and eject from the slot stones or other obstructions which may be lodged therein.

I claim as my invention—

1. The combination with a slotted conduit and a car, of a slot clearer consisting of a bar movably connected with the car and adapted to be lowered in the slot of the conduit, substantially as described.

2. The combination with a slotted conduit and a car, of a slot clearer comprising a bar pivoted at its upper end to the car and extending into the slot, and a rigid support limiting the downward movement of the bar for holding the same in operative position, substantially as described.

3. The combination with a slotted conduit and a car, of a slot clearer comprising a bar movable in a vertical plane and adapted for insertion through a slot, a stop on the car limiting the downward movement of the bar, and means attached to the bar for lifting the same, substantially as described.

In testimony that I claim the foregoing as my invention I affix my signature in presence of two witnesses.

JOHN C. LOVE.

Witnesses:
C. CLARENCE POOLE,
G. W. HIGGINS, Jr.